US 10,871,791 B2

(12) United States Patent
König

(10) Patent No.: US 10,871,791 B2
(45) Date of Patent: Dec. 22, 2020

(54) BATTERY EMULATOR AND METHOD FOR CONTROLLING THE BATTERY EMULATOR

(71) Applicant: AVL LIST GmbH, Graz (AT)

(72) Inventor: Oliver König, Graz (AT)

(73) Assignee: AVL LIST GmbH, Vienna (AT)

( * ) Notice: Subject to any disclaimer, the term of this patent is extended or adjusted under 35 U.S.C. 154(b) by 328 days.

(21) Appl. No.: 15/747,040

(22) PCT Filed: Jul. 22, 2016

(86) PCT No.: PCT/EP2016/067485
§ 371 (c)(1),
(2) Date: Jan. 23, 2018

(87) PCT Pub. No.: WO2017/016994
PCT Pub. Date: Feb. 2, 2017

(65) Prior Publication Data
US 2019/0011941 A1    Jan. 10, 2019

(30) Foreign Application Priority Data

Jul. 28, 2015    (AT) ............................ A 50676/2015

(51) Int. Cl.
*G05F 1/10*      (2006.01)
*B60L 3/00*      (2019.01)
(Continued)

(52) U.S. Cl.
CPC .............. *G05F 1/10* (2013.01); *B60L 3/0023* (2013.01); *G01M 13/02* (2013.01); *G01M 15/02* (2013.01);
(Continued)

(58) Field of Classification Search
CPC ......... G05F 1/10; G01M 15/02; G01M 13/02; G01M 17/007; B60L 3/0023;
(Continued)

(56) References Cited

U.S. PATENT DOCUMENTS 8,818,141 B1 *  8/2014  Hochberg ............... G02F 1/225
                                                         385/3
9,958,356 B2 *  5/2018  Konig ................... G01M 15/02
(Continued)

FOREIGN PATENT DOCUMENTS

DE    102007027049 A1    12/2008
DE    102009034555 A1    1/2011
(Continued)

OTHER PUBLICATIONS

Austrian Search Report Application No. A50676/2015 Completed Date: Jun. 24, 2016 1 page.
(Continued)

*Primary Examiner* — M Baye Diao
(74) *Attorney, Agent, or Firm* — Whitmyer IP Group LLC

(57) ABSTRACT

In order to achieve sufficiently stable output voltage with low losses even during rapid load changes in a battery emulator, a battery emulator is controlled using model-based control with a model of the battery emulator, wherein a line inductance of the electric line and the back-up capacitor is integrated into the model of the battery emulator.

18 Claims, 2 Drawing Sheets

(51) Int. Cl.
*G01M 13/02* (2019.01)
*G01M 15/02* (2006.01)

(52) U.S. Cl.
CPC ....... *B60L 2210/10* (2013.01); *B60L 2210/30* (2013.01); *B60L 2240/547* (2013.01); *B60L 2240/549* (2013.01); *B60L 2270/40* (2013.01); *Y02T 10/72* (2013.01)

(58) Field of Classification Search
CPC ............ B60L 2210/30; B60L 2270/40; B60L 2240/549; B60L 2240/547; B60L 2210/10; B60L 50/50; Y02T 10/7241; Y02T 10/7216; G05D 1/00; G05B 13/048
USPC ......................................................... 320/132
See application file for complete search history.

(56) References Cited

U.S. PATENT DOCUMENTS

| | | | |
|---|---|---|---|
| 10,216,153 B2 * | 2/2019 | Batliner | H02M 3/1584 |
| 10,270,251 B1 * | 4/2019 | Neely | H02J 1/14 |
| 2015/0112620 A1 | 4/2015 | Konig et al. | |
| 2015/0143885 A1 | 5/2015 | Konig et al. | |

FOREIGN PATENT DOCUMENTS

| | | |
|---|---|---|
| JP | 10304677 A | 11/1998 |
| JP | 3402117 B2 | 4/2003 |
| JP | 2011158354 A | 8/2011 |
| WO | 2013135741 A1 | 9/2013 |
| WO | 2013174967 A1 | 11/2013 |
| WO | 2013174972 A1 | 11/2013 |

OTHER PUBLICATIONS

Oliver Konig et al: "Model predictive control of a battery emulator for testing of hybrid and electric powertrains" 2011 IEEE Vehicle Power and Propulsion Conference (VPPC 2011): Chicago, Illinois, USA, Sep. 6-9, 2011, IEEE, Piscataway, NJ, Sep. 6, 2011 (Sep. 6, 2011) pp. 1-6 XP031974964, ISBN: 978-1-61284-247-6.
PCT Search Report Application No. PCT/EP2016/067485 Completed Date: Sep. 30, 2016; dated Oct. 13, 2016 12 pages.

* cited by examiner

BATTERY EMULATOR AND METHOD FOR CONTROLLING THE BATTERY EMULATOR

TECHNICAL FIELD

The present teachings relate to a method for controlling a battery emulator having an output filter with a filter capacitor and a separate back-up capacitor, wherein the filter capacitor of the battery emulator is linked to the back-up capacitor via an electric line, and for controlling a model-based control using a model of the battery emulator is employed. The invention further relates to a battery emulator having a voltage supply, which has an input-side rectifier with a direct current intermediate circuit, a DC-DC converter that is connected thereto and an output filter with a filter capacitor at the output of the DC-DC converter, having a back-up capacitor, which is physically separated from the voltage supply, wherein the filter capacitor is linked to the back-up capacitor via an electric line, and having an emulator control unit for the model-based control of the battery emulator, in which a model of the battery emulator is implemented, and the present teachings also relate to the use of the battery emulator to test an electrical test object.

BACKGROUND

In developing hybrid drive trains or hybrid vehicles, tests of said hybrid drive trains or hybrid vehicles or components thereof are required on a test bench during the various phases of development. However, it often happens that the traction batteries are not yet available, especially during the early testing phases. In later developmental phases, too, though, it is frequently desirable to perform tests without the traction battery, since the traction batteries require complicated handling. For example, traction batteries have to be conditioned for a test, which can involve tempering, setting a state of charge (SoC) or setting a state of health (SoH). Apart from this, tests with real physical traction batteries are hardly reproducible. For this reason, tests such as these often employ so-called battery emulators, which simulate the traction battery. A battery emulator is usually a power electronic converter which provides a desired direct current voltage at the output that is connected to an electrical load, such as the hybrid drive train. Depending on the current electrical load, a particular load current occurs at the output of the inverter. In a real hybrid drive train, however, the load current can change very quickly. Apart from that, the battery emulator powers a drive inverter of the hybrid drive train, which can lead to high-frequency feedback on the battery emulator. These conditions result in stability problems in the operation of the battery emulator.

A battery emulator of this type is known from WO 2013/174967 A1, in which model-based—in this case model-predictive—control is used, wherein a load model of the drive system is integrated into the model of the controlled system. Owing to this integration of the load model, the control can be stabilized and good transient response can be achieved.

A solar inverter that converts a direct current from the solar modules into alternating voltage is known from JP 3402117 B2. The solar inverter is controlled in a conventional way by a state controller with amplification factors and integration of the control error. The amplification factors are determined from a state space model of the inverter, wherein a line inductance is also integrated into the state space model. Document JP 3402117 B2 thus does not disclose model-based control, but instead the state space model is simply used to design the controller in a conventional way.

It is likewise known that the output of a battery emulator can be supported with a large (and switchable, if need be) back-up capacitor. In order to dampen resonances between parasitic line inductances in the line between the battery emulator and the connected load and the back-up capacitor, a damping resistor is also often used in series in the line to the load or in parallel with the back-up capacitor. Due to the power required for the applications, which are typically several 100 kW, the battery emulators are commensurately large and can generally not be installed directly adjacent to the load, but must instead be several meters away. In this regard, distances of 10 to 50 m on a test bench are quite common. In combination with the back-up capacitor of the battery emulator and the input capacitor of the electrical load (drive inverter), the resulting parasitic line inductance creates an oscillating circuit, which can be excited both by the control of the battery emulator and by the load. As a consequence, the voltage control of the battery emulator can become unstable, and it may become necessary to abort the test run on the test bench. In the worst case scenario, the electrical load that is supposed to be tested as a test object on the test bench could even be damaged. This can be improved by the use of larger back-up capacitors. The bigger the back-up capacitor, the more stable the output voltage becomes, but at the same time the smaller the maximum possible rate of change of the output voltage becomes because of the necessarily large discharge/charge currents. On the other hand, however, a quick voltage change is needed for a high fidelity reproduction of a battery impedance during quick load changes. Therefore, a large back-up capacitor is counterproductive. In an inverter such as the one described in JP 3402117 B2, an output-side back-up capacitor $C_S$ naturally cannot be used.

Additionally, the passive damping resistor leads to significant losses and also limits the regenerative capability in cases of low voltage and high currents. For this reason, too, a damping resistor is undesirable.

SUMMARY

Thus a problem addressed by the present teachings is to reduce the aforementioned difficulties and, in particular, to provide a battery emulator with sufficiently stable output voltage, even when quick load changes are occurring, and with low losses.

This problem is addressed by integrating a line inductance of the electric line and the back-up capacitor into the model of the battery emulator. The physically separate back-up capacitor backs-up the output voltage of the battery emulator directly at the test object. To improve the control accuracy of the battery emulator, the line inductance and the back-up capacitor are integrated into the model of the battery emulator, whereupon it becomes possible to realize high control bandwidth and quick load changes with sufficient stability of the control. At the same time, additional damping resistors become superfluous, since the control itself is capable of damping resonances sufficiently fast.

The control accuracy can be further improved if a load model of an electrical test object that is powered by the battery emulator is additionally integrated into the battery emulator model. Thus the control can even more efficiently take into account the entire dynamic of the controlled system.

Due to the simplicity, it is advantageous for an input capacitance of the test object or a constant power load to be used as the load model, wherein the constant power load is linearized around an operating point of the battery emulator.

BRIEF DESCRIPTION OF THE DRAWINGS

The present invention is explained in greater detail below with reference to FIGS. 1 through 3, which show exemplary, schematic, non-restrictive and advantageous embodiments of the invention. The following is shown.

DETAILED DESCRIPTION

Figure 1:
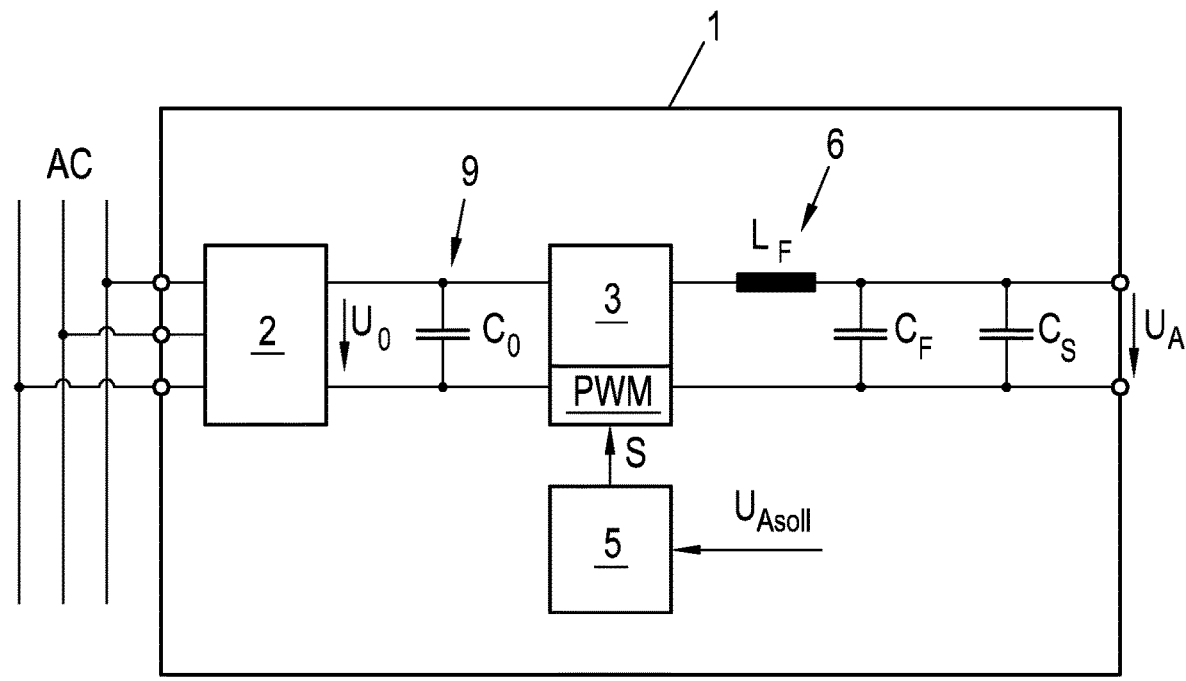
FIG. 1 a battery emulator according to the prior art.

The battery emulator 1 according to the present teachings comprises an input-side rectifier 2, which is connected via a direct current intermediate circuit 9 to an intermediate circuit voltage $V_0$ and an intermediate circuit capacitor $C_0$ with a DC-DC converter 3. The battery emulator 1 is powered by an alternating current network AC. An output filter 6 comprising a filter inductor $L_F$ in series with the output line and a parallel connected filter capacitor $C_F$ is arranged on the output of the DC-DC converter 3. As is known, the DC-DC converter 3 can also have a multiphase configuration, wherein a filter inductor $L_F$ is provided for each phase in this case. The DC-DC converter 3 is implemented, for example, as a synchronous converter having a plurality of half-bridges (one half-bridge per phase) with semiconductor switches. A battery emulator 1 such as this is known from FIG. 2 of WO 2013/174967 A1, for instance.

On the output side, a back-up capacitor $C_S$ is further provided parallel to the output connectors, to which the output voltage $u_A$ is applied, and parallel to the filter capacitor $C_F$.

Furthermore, an emulator control unit 5 that controls the DC-DC converter 3 and/or the switches of the DC-DC converter 3 is provided in the battery emulator 1 in order generate the desired output voltage $u_{Asoll}$, which is requested by a superordinate control unit. Usually, a pulse width modification PWM is implemented in order to drive the semiconductor switches of the DC-DC converter 3, as is sufficiently well known and as is indicated in FIG. 1. The pulse width modification PWM could also be implemented directly in the emulator control unit 5. Said emulator control unit 5 generates the control variable s for the DC-DC converter 3 or the pulse width modification (PWM) from the set-point value of the control, in this case the output voltage $u_{Asoll}$.

Figure 2:
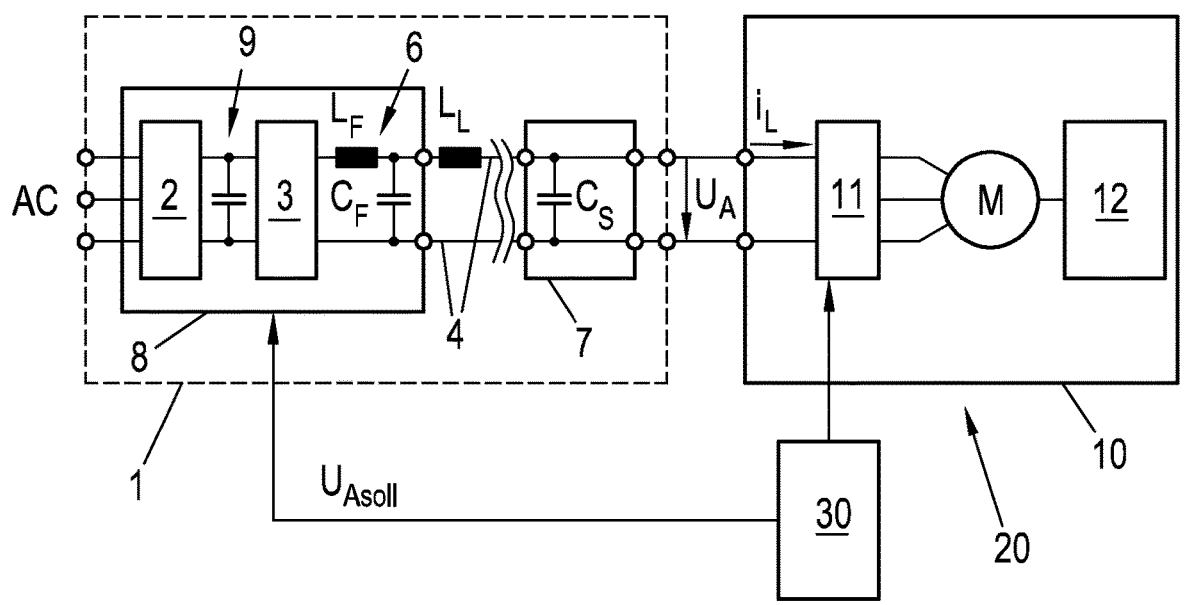
FIG. 2 a battery emulator according to the invention with an electrical test object and FIG. 3 a block diagram of the model structure of the battery emulator.

As the first measure according to the invention, the back-up capacitor $C_S$ of the battery emulator 1 is physically separated and by distance from the rest of the components of the battery emulator 1. The back-up capacitor $C_S$ is arranged in a separate junction box 7, for example, as is shown in FIG. 2. The result is a distributed battery emulator 1 with a voltage supply 8 and a physically separate junction box 7 with the back-up capacitor $C_S$. The junction box 7 with the back-up capacitor $C_S$ is then connected to the output filter 7 via a line 4. The rectifier 2, the DC intermediate circuit, the DC-DC converter 3 and the output filter 6 are arranged in the voltage supply 8. This makes it possible, despite the structural size of the battery emulator 1, to arrange the back-up capacitor $C_S$ physically separated from the power supply 8 and close to the electrical load. The line 4 can thus be very long, as is indicated by the interruption in FIG. 2, and can even reach lengths of 10 to 50 m. For this reason, although it is possible to stabilize the output voltage $u_A$ of the battery emulator 1 that is applied to the back-up capacitor $C_S$, the dynamics of the distributed battery emulator 1 become more complex and difficult to control because the resulting line inductance $L_L$ together with the filter capacitor $C_F$ and the back-up capacitor $C_S$ form an additional oscillating circuit. As a result, this oscillating circuit has another resonance in addition to the one between the filter inductor $L_F$ and the filter capacitor $C_F$. The controller of the battery emulator 1 may not excite the resonances and it must dampen them when excited by the test object 10.

In order to make it possible to control the battery emulator 1 that is distributed in this way so as to achieve high dynamics (high rate of change in the output voltage $u_A$), a model-based control based on a model of the battery emulator 1 is provided. The model of the battery emulator 1 is used in the emulator control unit 5 in a model-based control, such as model-predictive control, to control the battery emulator 1. "Model-based control" in this instance means that the model and/or the model output is used to calculate the control variable $s_k$ of the battery emulator 1 for the next sampling step k. The model of the battery emulator 1 also includes the back-up capacitor $C_S$ and the line inductance $L_L$ of the line 4 that is present between the voltage supply 8 and the back-up capacitor $C_S$, as is indicated in FIG. 2.

In the application according to the invention, the line inductance $L_L$ is dominant and sufficient. It should be noted, though, that the capacitance per unit length and/or the conductance per unit length and/or the resistance per unit length of the line 4 could additionally be taken into account in the model of the battery emulator 1.

To perform a test run on a test bench 20, the battery emulator 1 and/or the junction box 7 of the battery emulator 1 is connected to the electrical test object 10. Said test object 10 consists e.g. of a drive inverter 11 that powers an electric motor M. The electric motor M propels any load 12, such as a load machine or a drive train with a load machine. The test object 10 can be a hybrid drive train of a vehicle, for instance. A test bench computer 30 is also provided on the test bench 20 to control and monitor the execution of the test run. In so doing, the test bench computer 30 sets the desired output voltage $u_{Asoll}$ and a set-point value for the drive inverter 11. Measuring devices are also provided on the test bench 20, of course, in order to acquire the required measurement values for control to carry out the test run, such as a torque, a speed, electrical currents or electrical voltages in the hybrid drive train. For the sake of clarity, the measuring devices are not shown.

Figure 3:
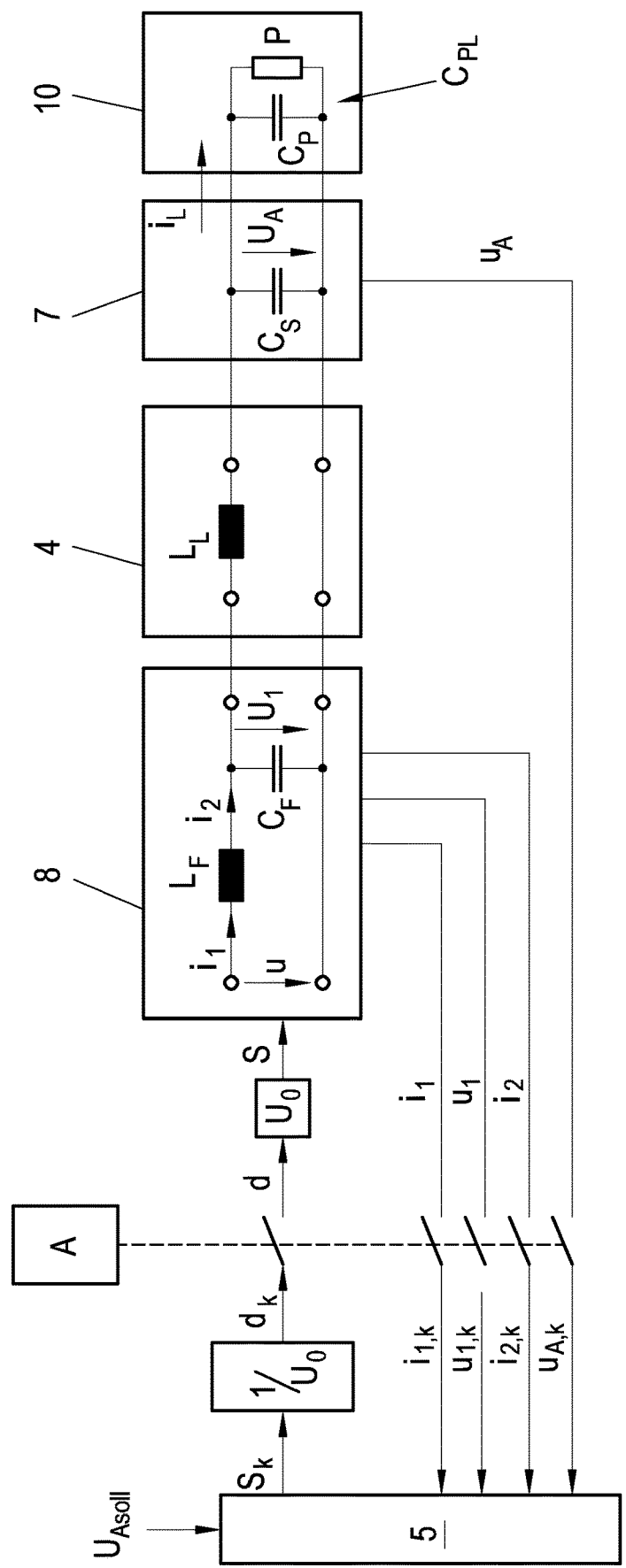

This results in the block diagram of the model of the battery emulator 1, as shown in FIG. 3, wherein the electrical test object 10 with a load model is also included in this case.

From an electrical standpoint, the test object 10 forms a constant power load CPL, as is described in WO 2013/174967 A1. The constant power load SPL results in a non-linear equation of state, which is linearized around an operating point, as is likewise described in WO 2013/174967 A1. The relationship between the current accommodated by the constant power load CPL and the supply voltage $u_A$ of the constant power load CPL is then expressed as $$\tilde{i}_L = \frac{P}{u_A},$$

with the power requirement P of the test object 10. By introducing an operating point-dependent differential equivalent resistance $$r_P = -\frac{u_A^2}{P},$$

the equation of state can be linearized around an operating point in the form of an output voltage $u_A$ and a load current $i_L$. This load model in the form of the constant power load CPL can likewise be integrated into the model of the battery emulator 1, as is described in WO 2013/174967 A1. In a simpler configuration, the load model could simply be formed from the input capacitance of the test object 10. This input capacitance can be measured easily or is known. However, the load model also cannot be integrated into the model of the battery emulator 1 at all.

With the model structure as shown in FIG. 3, the following equation of state can be established as a model of the battery emulator 1, in which the input capacitance $C_P$ of the test object 10 is used as a load model, although it could also be omitted for the sake of simplicity. With the state vector $x_c = [i_1 \ v_1 \ i_2 \ u_A]^T$, which is measured during operating, the state space model is expressed as $$\dot{x}_c = \begin{bmatrix} \frac{-R_{L_F}}{L_F} & \frac{-1}{L_F} & 0 & 0 \\ \frac{1}{C_F} & 0 & \frac{-1}{C_F} & 0 \\ 0 & \frac{1}{L_L} & \frac{-R_{L_L}}{L_L} & \frac{-1}{L_L} \\ 0 & 0 & \frac{1}{C_S+C_P} & 0 \end{bmatrix} x_c + \begin{bmatrix} \frac{1}{L_F} \\ 0 \\ 0 \\ 0 \end{bmatrix} s + \begin{bmatrix} 0 \\ 0 \\ 0 \\ \frac{-1}{C_S+C_P} \end{bmatrix} i_L.$$

Here, $R_{L_F}$ represents the parasitic resistance of the filter inductor $L_F$, and $R_{L_L}$ represents the line resistance of the line 4, which is known or can be measured. The control variable s is obtained from $s = d \cdot u_0$, with the duty cycle d of the pulse width modulation PWM. In the case of a multi-phase DC-DC converter 3, the individual filter inductors of each phase are combined into a filter inductor $L_F$, and the currents of the individual phases are added to a common choke current $i_1$. Naturally, values of the state vector $x_c$ could also be estimated by a control observer if they are not measured directly.

Using the described load model for a constant power load CPL, it is possible to expand this state space model by inserting the differential equivalent resistance $r_P$.

$$\dot{x}_c = \begin{bmatrix} \frac{-R_{L_F}}{L_F} & \frac{-1}{L_F} & 0 & 0 \\ \frac{1}{C_F} & 0 & \frac{-1}{C_F} & 0 \\ 0 & \frac{1}{L_L} & \frac{-R_{L_L}}{L_L} & \frac{-1}{L_L} \\ 0 & 0 & \frac{1}{C_S+C_P} & \frac{-1}{(C_S+C_P)r_P} \end{bmatrix} x_c + \begin{bmatrix} \frac{1}{L_F} \\ 0 \\ 0 \\ 0 \end{bmatrix} s + \begin{bmatrix} 0 \\ 0 \\ 0 \\ \frac{-1}{C_S+C_P} \end{bmatrix} \tilde{i}_L.$$

This equation of state applies to a particular operating point of the battery emulator 1. For this reason, the model must be adapted to the respective operating point during operation. The advantage of utilizing this load model is that only two additional parameters are required for it, which are simple to determine.

For the control, the time-continuous state space model is converted into a time-discrete state space model in a known way. The sampling A is indicated in FIG. 3 and can be carried out e.g. at a frequency of 16 kHz.

The model of the battery emulator 1 with the model parameters can be established beforehand and can be considered known. The load model, on the other hand, can change depending on the electrical load connected to it and is often unknown. In this instance, the model parameters of the load model can be identified by automated identification methods, which are known per se.

To this end, the test set-up, consisting of the battery emulator 1 and the test object 10, can be excited with an excitation sequence in the form of a prescribed time characteristic of the output voltage $u_A$. If the input capacitance $C_P$ of the test object 10 is less than the capacitance of the back-up capacitor $C_S$, the identification can be carried out with the disconnected test object 10. If the input capacitance $C_P$ of the test object 10 is greater than or equal to the capacitance of the decoupling capacitor $C_S$, the test object 10 significantly influences the dynamics and must be connected for parameter identification. However, the parameter identification can then be carried out without a load and with a shut-off test object 10. The reaction of the test set-up is measured and recorded in the form of measured values (according to the model structure). The model of the battery emulator 1 (output filter 8+line 4+junction box 7 with back-up capacitor $C_S$+test object 10, if required) is subsequently excited with the same excitation sequence, and the model output is simulated and likewise recorded. The difference between the measured values/signals that are measured and the measured values/signals that are simulated is then used as an error in order to minimize these errors in an optimization, e.g. with a least square method, as a function of the model parameters. This identification of the load model can be performed before each test run, for example, or else one time for each test object 10.

The invention claimed is:

1. A method for controlling a battery emulator, comprising:
   a voltage supply having an output filter with a filter capacitor and a back-up capacitor having an output voltage applied, the back-up capacitor connected in parallel to the filter capacitor, wherein the filter capacitor is connected to the back-up capacitor with an electric line in order to physically separate the back-up capacitor from the voltage supply, the method comprising:
   controlling the output with a model-based control using a model of the battery emulator, wherein a line inductance of the electric line and the back-up capacitor are integrated into the model of the battery emulator.

2. The method according to claim 1, wherein a load model of an electrical test object that is powered by the battery emulator is additionally integrated into the model of the battery emulator.

3. The method according to claim 2, wherein an input capacitance of the test object is used as the load model.

4. The method according to claim 2, wherein a constant power load is used as the load model, wherein the constant power load is linearized around an operating point of the battery emulator.

5. A battery emulator comprising: a voltage supply, having:
- an input-side rectifier with a direct current intermediate circuit, and
- a DC-DC converter that is connected to the direct current intermediate circuit, and an output filter with a filter capacitor at the output of the DC-DC converter, a back-up capacitor having an output voltage applied,
an electric line connecting the filter capacitor to the back-up capacitor in order to physically separate the back-up capacitor from the voltage supply, and
an emulator control unit for model-based control of the output voltage, in which a model of the battery emulator is implemented, wherein a line inductance of the electric line and the back-up capacitor are integrated into the model of the battery emulator.

6. A method of using the battery emulator according to claim 5, comprising testing an electrical test object, wherein the battery emulator is connected to the electrical test object and provides a supply voltage for the electrical test object.

7. The method according to claim 6, wherein a load model of an electrical test object is additionally integrated into the model of the battery emulator.

8. The method according to claim 1, wherein the back-up capacitor is arranged in a junction box physically separate from the voltage supply.

9. The method according to claim 1, further comprising testing an electrical test object, wherein the battery emulator is connected to the electrical test object and provides a supply voltage for the electrical test object.

10. The battery emulator according to claim 5, further comprising a junction box in which the back-up capacitor is arranged, the junction box physically separate from the voltage supply.

11. A battery emulator for testing a test object, comprising:
- a voltage supply having an output filter with a filter capacitor at the output of a DC-DC converter;
- a back-up capacitor having an output voltage applied;
- an electric line connecting the filter capacitor and the back-up capacitor in order to physically separate the back-up capacitor from the voltage supply;
- an emulator control unit for model-based control of the output voltage, the emulator control unit implementing a model of the battery emulator that integrates a line inductance of the electric line and the back-up capacitor.

12. The battery emulator according to claim 11, further comprising a junction box in which the back-up capacitor is arranged, the junction box physically separate from the voltage supply.

13. The battery emulator according to claim 11, wherein the model of the battery emulator comprises a load model of an electrical test object that is powered by the battery emulator.

14. The battery emulator according to claim 13, wherein a constant power load is used as the load model, wherein the constant power load is linearized around an operating point of the battery emulator.

15. A method of using the battery emulator according to claim 11, comprising testing an electrical test object, wherein the battery emulator is connected to the electrical test object and provides a supply voltage for the electrical test object.

16. A test bench, comprising the battery emulator according to claim 11.

17. A method of using the test bench according to claim 16, comprising:
- connecting a test object on the test bench to the battery emulator;
- controlling supply voltage to the test object.

18. The method according to claim 17, wherein the test object comprises a hybrid drive train.

* * * * *